Dec. 24, 1963  H. GOLDSCHMIDT ETAL  3,115,166
SLIDING TABLE SAW
Original Filed May 22, 1958  5 Sheets-Sheet 1

INVENTORS
HANS GOLDSCHMIDT,
JOHN W. EDGEMOND, JR.

BY *Jungblut, Melville, Strasser + Foster*

ATTORNEYS

INVENTORS
HANS GOLDSCHMIDT,
JOHN W. EDGEMOND, JR.
BY
ATTORNEYS

Dec. 24, 1963   H. GOLDSCHMIDT ETAL   3,115,166
SLIDING TABLE SAW
Original Filed May 22, 1958   5 Sheets-Sheet 3

INVENTORS
HANS GOLDSCHMIDT,
JOHN W. EDGEMOND, JR.

BY *Youngblut, Melville, Strasser & Foster*
ATTORNEYS

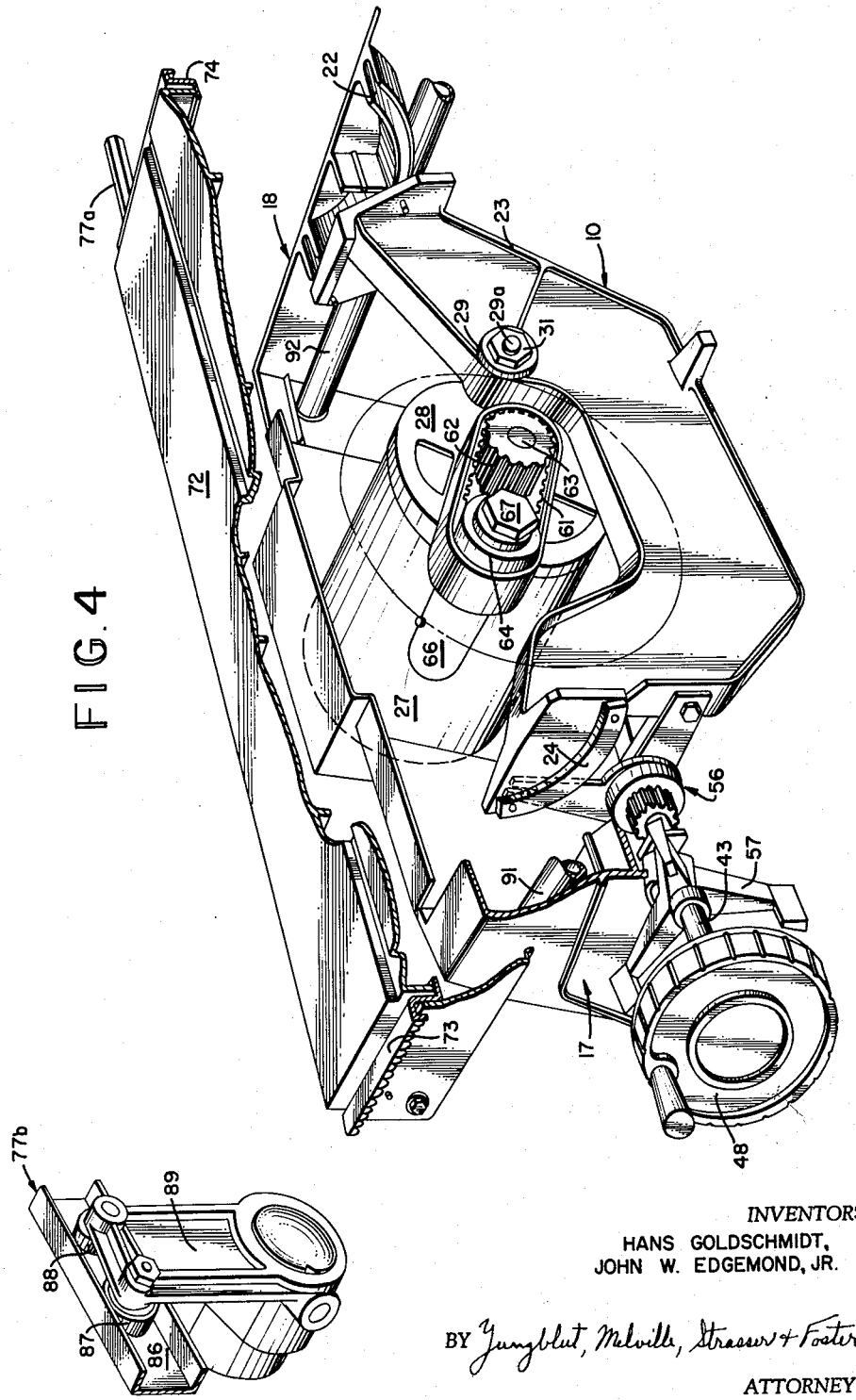

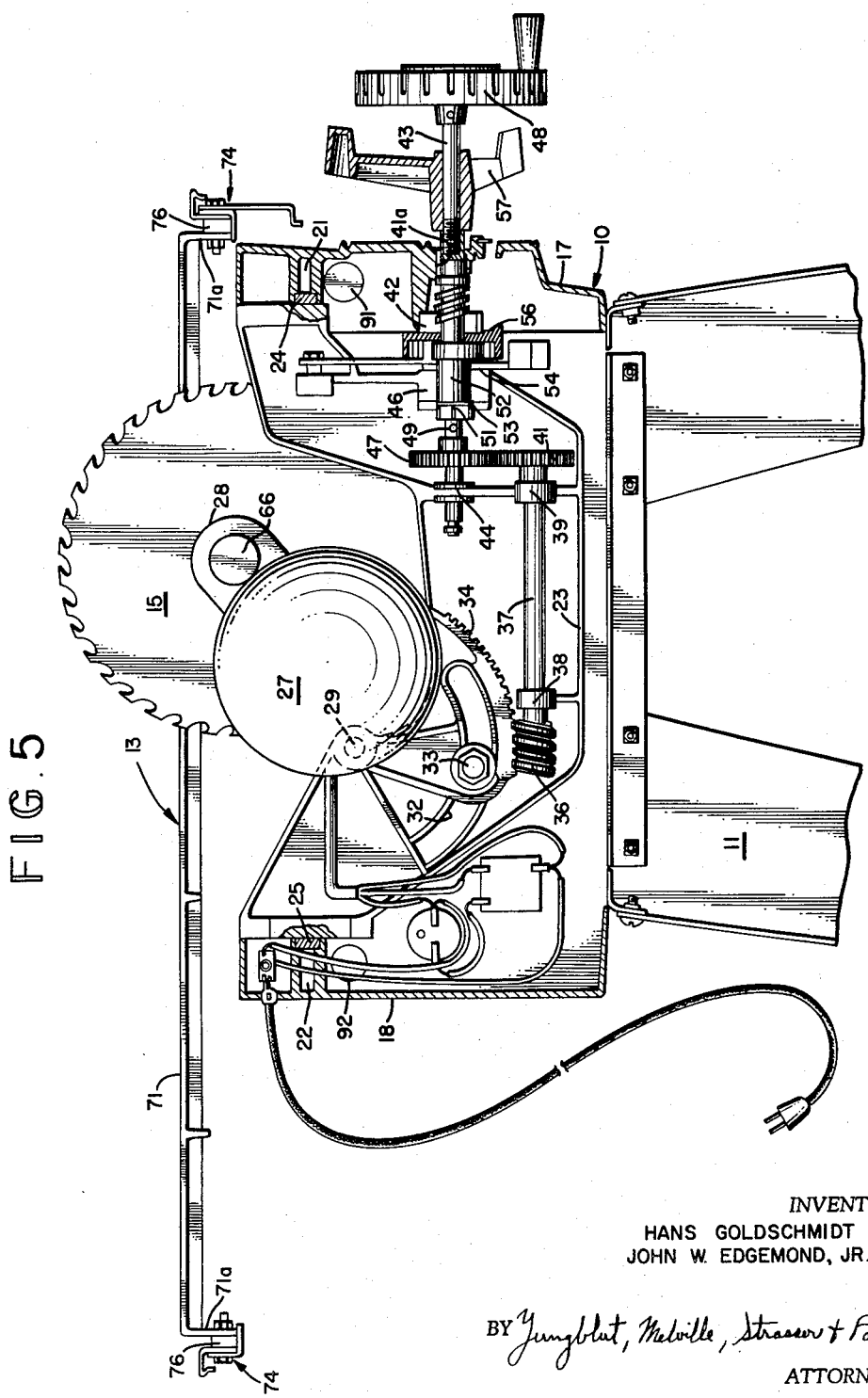

United States Patent Office 3,115,166
Patented Dec. 24, 1963

3,115,166
SLIDING TABLE SAW
Hans Goldschmidt, Atherton, and John W. Edgemond, Jr., Los Altos, Calif., assignors, by mesne assignments, to Magna American Corporation, Cincinnati, Ohio, a corporation of Ohio
Original application May 22, 1958, Ser. No. 737,087, now Patent No. 2,974,693, dated Mar. 14, 1961. Divided and this application Nov. 16, 1960, Ser. No. 70,873
2 Claims. (Cl. 143—52)

This invention relates to sliding table saws and particularly to table saws of the type in which the mechanism for driving the blade, for tilting the blade, and for raising and lowering the blade are all mounted in a stationary member (hereinafter referred to as a tub) and in which the table may be caused to be reciprocated in a horizontal plane with respect to the saw blade, regardless of its elevation or its tilt.

It is a further object of this invention to provide a sliding table saw of the character in which the table may be locked in a predetermined position at the will of the operator whereby the saw may be used as a conventional power saw.

It is a further object of this invention to provide a device of this character in which one-half of the table is slidable toward and away from the other half whereby tools of various types, such as dadoes, molders, etc. may be accommodated to be used therewith.

It is a further object of this invention to provide a suitable means for squaring the guides upon which the sliding table is adapted to reciprocate and for adjusting them.

It is a further object of this invention to provide a simple form of motor and arbor assembly in which the motor is provided with a single cast bell housing (1) which provides an axis about which the arbor may be rotated, (2) which provides a rack for control of the motor about this axis, (3) which provides a simple arbor and arbor support and (4) in which the entire drive mechanism is suitably enclosed to eliminate the danger hazard and to seal the working parts from dust which is commonly associated with sawing operations.

It is a further object of this invention to provide a single control means for stopping and starting the saw and for locking or operating the sliding table.

It is a further object of this invention to provide a suitable type of fence which may be utilized in conjunction with a sliding table which facilitates tenoning and similar operations.

Other objects and advantages of the present invention will be apparent from the following specification taken in conjunction with the accompanying drawing in which:

FIGURE 1 represents a front view of a sliding table saw illustrating particularly the front end of the tub and the single control means for raising and lowering and tilting the saw blade and for locking the saw blade in tilted position, as well as the single control handle which starts and stops the saw and locks or permits the saw to be slid and which shows other important features as will more fully hereinafter be explained;

FIGURE 4 is a three-quarter view, partially in section, showing some of the details of the means for tilting and locking the blade and for raising and lowering the same and includes some details of the arbor drive mechanism;

FIGURE 5 is a side view with one side wall of the tub removed and illustrates, partially in cross-section, the means for raising and lowering and tilting the saw blade and illustrates the electrical mechanism used in conjunction with our device;

FIGURE 6 (Sheet 1) is a partial view of the single control mechanism for starting and stopping the saw and locking or permitting movement of the sliding table and illustrates the single handle and the detent mechanism which restricts rotary movement thereof;

FIGURE 7 is a view of a portion of the lock-out flange which restricts movement of the single control mechanism for certain purposes;

FIGURE 9 is an end view of the mechanism illustrated in FIGURE 9a;

FIGURE 9a is a side view of the locking mechanism by which the table is either locked or permitted to slide.

This application is a division of application Serial No. 737,087, filed May 22, 1958, for "Sliding Table Saw," and issued March 14, 1961, as Patent No. 2,974,693.

Figure 1:
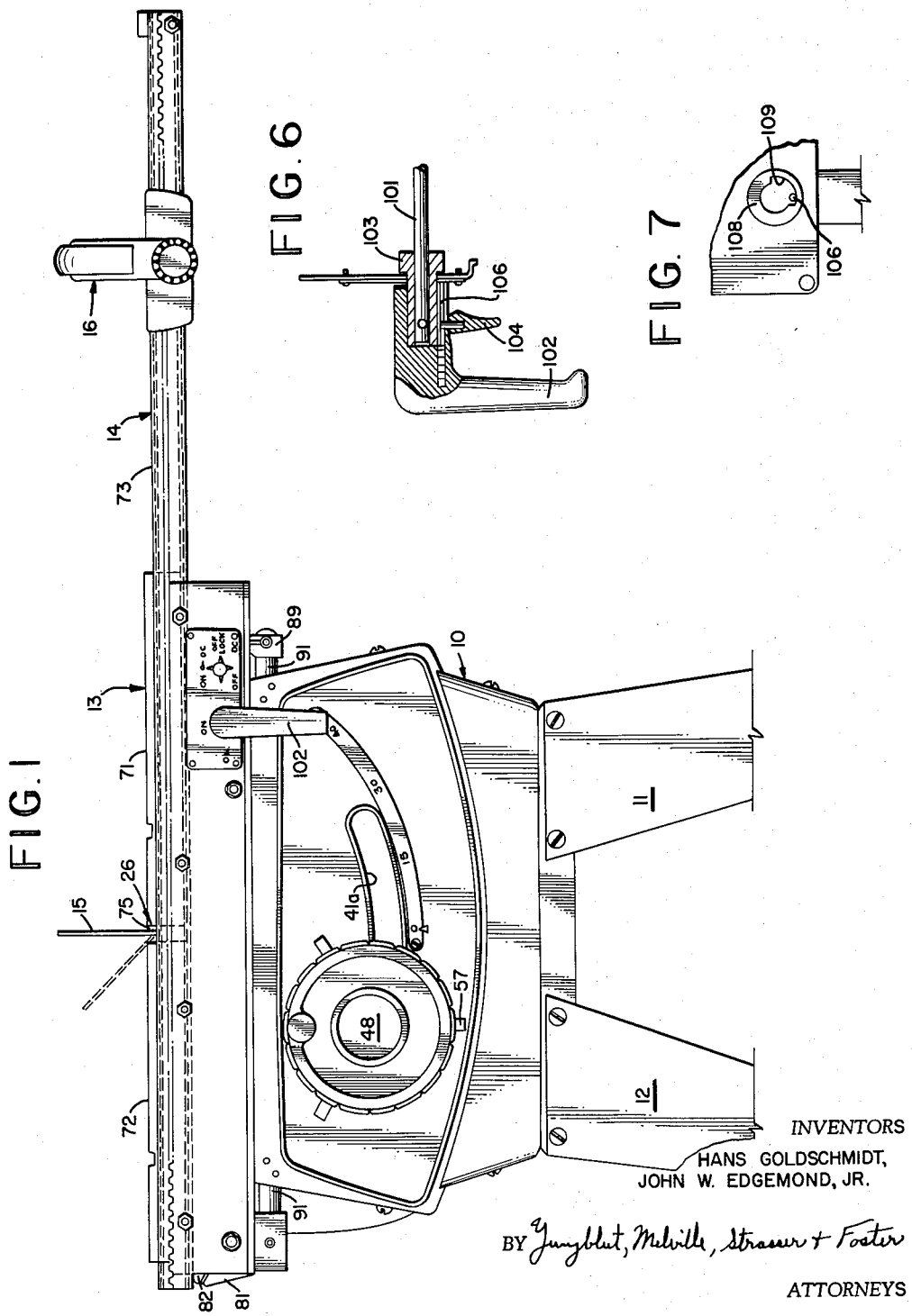

As illustrated particularly in FIGURE 1 our device consists of a tub assembly 10 which is mounted upon suitable legs 11 and 12 and which, in turn, supports a sliding table assembly 13 which is provided with rails or outriggers 14 whose purpose will more fully hereinafter be described and which support a movable fence 16.

As illustrated particularly in FIGURES 4 and 5, the tub assembly 10 consists of a pair of end castings. The front end casting 17 is substantially identical to the front end casting illustrated in application Serial No. 631,820, filed December 31, 1956, for a "Power Saw" in the names of John W. Edgemond, Jr., and John J. O'connor and issued July 19, 1960, as Patent No. 2,945,516. The front integral casting 17 and the rear casting 18 are provided with arcuate slots which are concentric and which support a cradle 23 (FIGURES 3 and 4) which is provided with arcuate members 24 and 25 which may be secured thereto in any suitable manner, but which are adapted to be accommodated within the slots 21 and 22 respectively so that the cradle 23 may be moved arcuately about a line 26 on the table 13. Line 26 is the line at which the saw blade 15 projects through the top of the table 13. It will be apparent therefore that as the cradle 23 is swung about the line 26 the saw blade 15 which is supported by the cradle will likewise be tilted about the line 26 in such a manner that as a workpiece, which is supported upon the table 13 is cut, the kerf made by the blade 15 will be at the same angle. It will be noted that the members 24 and 25 are shorter in length than the arcuate slots 21 and 22. This is of course an essential requirement of construction to permit the members 24 and 25 to move through the entire lengths of the arcs formed by the slots 21 and 22 whereby the blade 15 may be moved from a vertical position to a position approximately 45° with respect thereto as indicated in the dotted line position illustrated in FIGURE 1.

The primary purpose of the cradle 23 is to support the saw 15 and the mechanism for driving it. As illustrated particularly in FIGURES 4 and 5 we have provided a motor 27 which is more or less conventional but which is provided with a particularly designed cast head assembly 28. This casting 28 forms a bell housing for one end of the motor and is provided with a threaded orifice to receive a hub 29 on the threaded member 29a which is accommodated within a bore in the cradle 23. A nut 31 completes the assembly and the entire motor 27 and the housing 28 pivot about the member 29. The member 28 is provided with an arcuate slot 32. A bolt 33 which is threadedly secured to the cradle 23 engages the slot 32 and limits the rotation of the member 28 about the member 29 and thus serves to limit the travel of the blade 15 between raised and lowered positions, as it is of course apparent to anyone skilled in the art that the point 29 is the point about which the blade 15 and the arbor are pivoted. Member 28 is also provided with teeth 34 which form an arcuate rack which is engaged by a worm-gear 36. The worm 36 is secured to shaft 37 which is rotatably mounted in bosses 38 and 39 which are formed integrally with the cradle 23. The shaft 37 is provided with a gear 41 which is pinned or otherwise fixed thereto. Rotation of the gear 41 and the shaft 37 will rotate the worm 36 and, by virtue of the engagement of the worm 36 and the rack 34 the saw 15 will be raised or lowered.

Integral die-cast front tub portion 17 is cast in such a manner as to provide an arcuate slot 41a and a plurality of teeth which form an arcuate rack 42 which is concentric with the slot 41a. A shaft 43 passes through the arcuate slot 41a and is adapted to move laterally along the length of the slot and to rotate therewithin. Movement of the shaft 43 along the slot 41a will result in tilting of the blade 15. The shaft 43 is supported in a pair of bosses 44 and 46 on the cradle 23 and is adapted to be rotated and to be moved longitudinally with respect thereto. The shaft 43 accommodates a gear 47 which may be moved into or out of engagement with the gear 41. When the handle 48 is rotated the shaft 43 and the gear 47 are likewise rotated. When the shaft 43 has been moved longitudinally to the left (as viewed in FIGURE 5) so that the gears 41 and 47 are in engagement, rotation of the hand-wheel 48 serves to raise and lower the blade 15 about the hub 29. However, as has previously been stated, the shaft 43 is likewise movable longitudinally. When the shaft 43 is moved longitudinally the pin 49 engages one of the slots 51 in a tubular member 52 which is rotatably mounted in the boss 46 but whose longitudinal movement with respect to the boss 46 is prevented by a pair of washers 53 and 54. The tubular member 52 is a part of a drive gear assembly which is disclosed and described in the aforementioned Edgemond and O'Connor Patent No. 2,945,516. This drive gear assembly consists of a suitable epicyclic gear construction which is self-contained and thereby free of dirt and contamination and which is adapted to cooperate with the rack 42 whereby, when this gear assembly is actuated, the cradle 23 is swung about the axes of the trunnions 21 and 22. Thus, by actuating the hand wheel 48 when the pin 29 is in engagement with one of the slots 51 (at which time it will be apparent that the gears 41 and 47 are not in engagement) the gear assembly 56 will engage the rack 42 and the cradle 23 will be swung about the axes of the trunnions 21 and 22, which, it will be recalled, is the line 26. Thus by actuating the hand wheel 48 the blade 15 may be tilted with respect to the table.

From the foregoing therefore it is apparent that a single control means is provided, which is substantially identical to the single control means disclosed in the aforementioned Edgemond and O'Connor Patent No. 2,945,516, whereby the blade 15 may be raised or lowered or may be tilted at the will of an operator. The locking mechanism 57 is provided and this locking mechanism is substantially identical to a similar locking mechanism disclosed and claimed in said Edgemond and O'Connor Patent No. 2,945,516.

The cast bell housing 28 also provides a suitable mounting for an internally threaded arbor which accommodates the saw blade 15. This internally threaded arbor is illustrated and disclosed in application Serial No. 681,372, filed August 30, 1957, in the names of Hans Goldschmidt and John W. Edgemond, Jr., entitled "Saw Arbor," and issued July 19, 1960, as Patent No. 2,945,519. An internally toothed belt 61 (FIGURE 4) is adapted to be driven by a gear 62 which is directly connected to and driven by a shaft 63 which is the motor shaft of the motor supported by the housing 28. The belt 61 likewise engages a similar gear 64 which is mounted upon a shaft which is supported by suitable bearings in an internally machined boss 66 which is cast integrally with the member 28. The gear 64 is provided with a coaxially aligned recess which is adapted to receive an internally threaded arbor. The internally threaded arbor is adapted to receive the bolt 67 which secures the saw blade 15 thereto.

Having thus described the tub which supports the cradle and cradle actuating mechanism and the motor support assembly, we shall now describe the sliding table which is adapted to be utilized in connection therewith.

The table assembly 13 consists of a pair of substantially identical table surface portions 71 and 72 (FIGURES 3 and 4) which are supported by a pair of parallel front and rear members 73 and 74 respectively. The member 72 is permanently affixed to the members 73 and 74 as by means of suitable bolts. Normally this portion 72 of the table remains affixed to the members 73 and 74 although it is apparent that it may be removed for certain specific purposes as by means of removing the bolts secured thereto.

Figure 2:
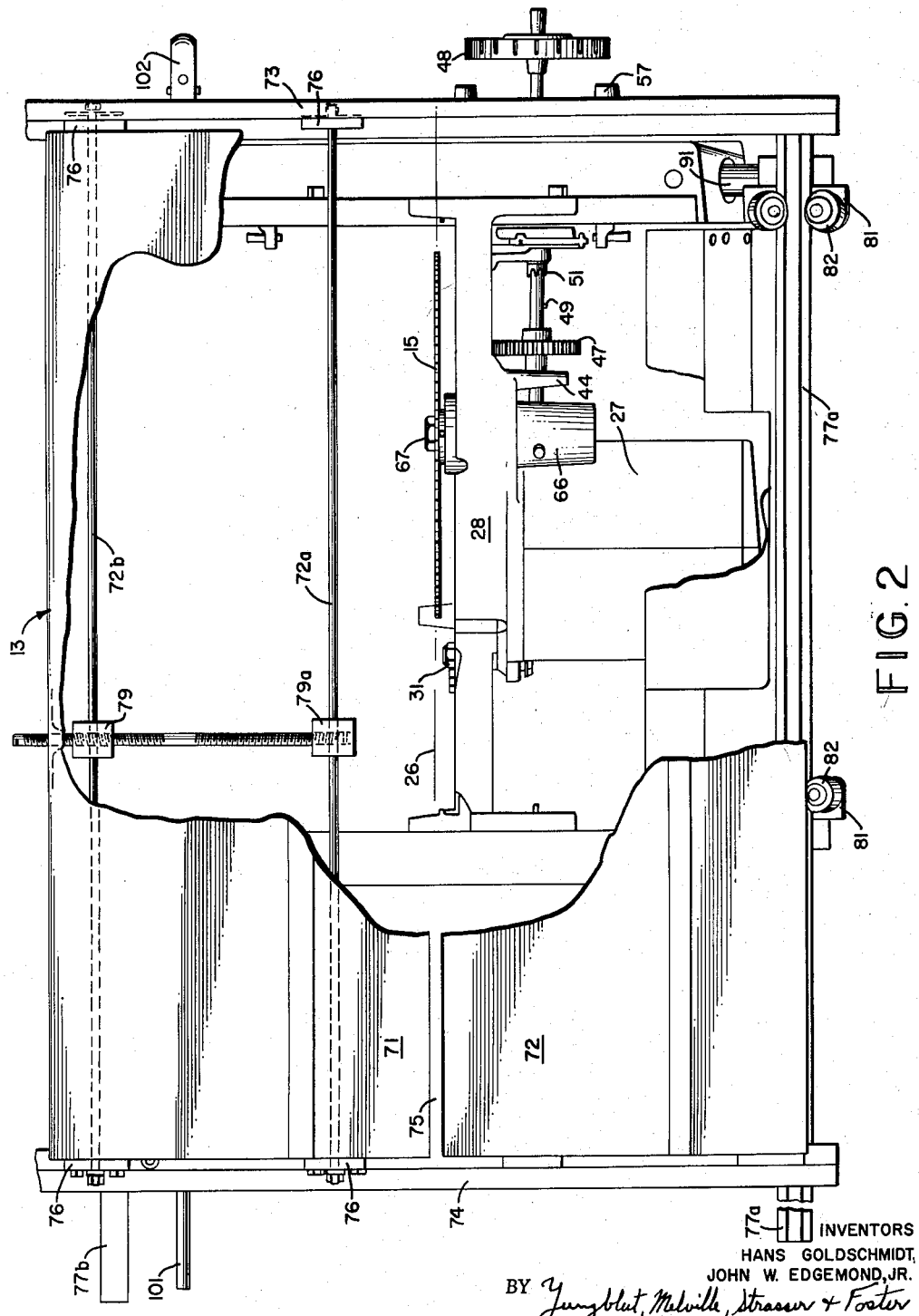
FIGURE 2 is a top view with the table removed showing the motor and the saw blade and the means for mounting the same and the members for supporting the sliding table.

The member 71 is movably mounted on the members 73 and 74 so that it can be moved toward and away from the member 72 to enlarge the width of the slot 75 between them to accommodate different types of tools, as for example, a dado, etc. Rather than using bolts similar to those which secure the chamber 72 to the members 73 and 74 we have provided a pair of elongated rods 72a and 72b which are secured at their ends to the members 73 and 74 and which pass through slots in the downwardly extending flanges 71a (FIGURE 5) of the table portion 71. Suitable blocks 76 are placed between the outer edges of the flanges 71a and the members 73 and 74 so that when the centers of the rods 72a and 72b are drawn together the clearance between the outer surfaces of the flanges 71a and the parallel cooperating flanges of the members 73 and 74 and the blocks 76 is reduced and the same are urged into tight frictional engagement whereby movement of the table 71 laterally with respect to the members 73 and 74 is prevented. Suitable means for urging the centers of the rods 72a and 72b together is illustrated in FIGURE 2 and consists generally of a screw mechanism which is rotatably mounted in a boss on the lower side of the table 71. Rotation of the threaded member urges the blocks 79 and 79a toward or away from each other, thus locking the table 71 against movement or releasing it for movement within the confines of the travel permitted by the rods 72a and 72b within the slots in the flanges 71a of the table portion 71.

Figure 10:
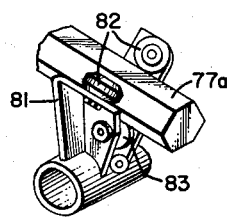
FIGURE 10 is a view of one of the supporting roller assemblies for one of the ways for the sliding table, and FIGURE 11 (Sheet 4) is a view of another of the roller mechanisms on which the ways for the sliding table slides.

The parallel horizontal members 73 and 74 are mounted upon a pair of ways 77a and 77b. The way 77a is preferably in the form of a hexagonal rod. It may be secured to the members 73 and 74 in any suitable manner as for example by means of bolts. The hexagonal rod 77a is supported in a pair of devices of the type illustrated generally in FIGURE 10. These devices, for example, consist of a pair of Y-shaped members 81. The arms of the Y each carry a pair of rollers 82 and the yoke of the Y carries a ball bearing supported roller 83 which is mounted upon an eccentric mechanism whereby, upon adjustment of the eccentric with respect to the yoke of the member 81, the roller 83 may be urged upwardly or downwardly thus urging the hexagonal way 77a into proper contact with the rollers 82. In this way lateral and vertical adjustment and stability are maintained.

The way 77b consists generally of a channel 86 (FIGURE 11). It is supported by a pair of rollers 87 and 88 which are supported upon a member 89. The roller 87 is a ball bearing type roller and is in turn eccentrically mounted with respect to the member 89. In this manner the position of the rollers 87 and 88 with respect to each other and with respect to the way 86 may be adjusted.

The members 81 and 89 are mounted upon cross tubes 91 and 92 which in turn are secured to the cast front and rear tub portions 17 and 18 respectively. It is apparent that the shafts 91 and 92 may be moved laterally with respect to the tub assembly 10 whereby the ways 77a and 77b may be repositioned with respect to each other. When this is done it is of course apparent that the members 81 and 89 will be repositioned and in this manner the members 73 and 74 may be squared with respect to each other as may the ways 77a and 77b. It is of course apparent that the entire table assembly must be so squared and so adjusted that when this table is reciprocated the slot 75 will be parallel at all times to the saw blade so that when a workpiece which is secured to the table top is advanced the cut or kerf produced by the saw blade 15 will be at the desired angle with respect to the workpiece.

The means for controlling the position of the table may briefly be described as follows and particular reference is directed to FIGURES 6, 7, 8 and 9.

It will be noted that we have provided an elongated control shaft 101. The shaft 101, at its forward end, is provided with a handle 102 which is keyed thereto in such a manner that when the handle is rotated the shaft is likewise rotated. The shaft is rotatably mounted in a bushing assembly 103 in the member 73 and extends through the fore and aft tub casting members 17 and 18.

Adjacent the forward end of the shaft 101 and integrally with the handle 102 we have provided a trigger mechanism 104 which actuates a detent pin 106. The detent pin 106 passes through a detent plate 108 which is secured to the front of the member 73. When the trigger 104 and the pin 106 are retracted it is apparent that the handle 102 may be rotated about 360°. However when the trigger 104 has not retracted the pin 106 will restrict the movement of the handle 102 through the 90° arc formed by the enlarged arcuate recess 109 in the plate 108.

It should be pointed out at this time that the handle and shaft move with the sliding table top assembly. If the sliding table cannot move the handle cannot be reciprocated fore and aft. If the handle 102 and the shaft 104 cannot be reciprocated then, and in that event, the table top may not be reciprocated.

Figures 9, 9A:
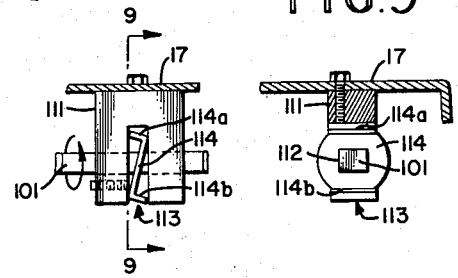

We have provided a locking mechanism which is more completely illustrated in FIGURES 9 and 9a. This locking mechanism consists of a block 111 which is secured to the front cast tub portion 17. The block 111 is provided with a bore 112 which accommodates the rod 101. A transverse slot 113 accommodates a washer 114 which is formed with a pair of offsets 114a and 114b. When the shaft 101 is rotated to a position at which the offsets 114a and 114b engages the sides of the slot 113 the washer 114 will be tilted and the hole in the washer will cam against the rod 101 and lock it with respect to the washer. When so operated the shaft will be locked with respect to the block and the table 71 cannot be reciprocated. However when the shaft is turned to the position at which the washer does not jam against the shaft, then the shaft may be moved longitudinally with respect to the block 111. In this event the table can be moved upon reciprocation of the shaft. Detents may be provided to indicate 90° rotation.

Near the rear end of the shaft we have provided a switching arrangement for supplying electric current to the motor. The switch is a conventional toggle switch whose actuating handle 121 extends into a box defined by walls 122. The walls 122 receive the shaft 101. The shaft 101 is provided with an enlarged barrel-like member 123 which is provided with a cam track 124 which is adapted to receive the switch handle 121. Thus when the shaft 101 is rotated the cam track 124 will actuate the toggle switch 121 to either open or close the circuit to the motor.

Operation of the entire device may briefly be described as follows:

The device is first connected to a suitable source of electric current whereby, when the circuit to the motor is closed, the saw blade 15 will be caused to be rotated. The operator first examines the structure to determine whether or not the saw blade is tilted to the proper angle or is raised or lowered to the proper height to perform the desired cut.

Let is be assumed that the operator wishes to change the height of the saw blade. He will actuate the handle 48 in such a manner that the shaft 43 will be pushed to the extreme left hand position illustrated in FIGURE 5 so that the gears 41 and 47 will be in mesh. Rotation of the actuating handle 48 will then cause the worm gear 36 to actuate the rack 34 so that the saw blade is raised or lowered about the pivot point formed by the bolt 29.

Then let it be assumed that the operator wishes to change the angle at which the cut is to be made. The operator will then move the control handle 48 to the right as viewed in FIGURE 5 with the result that the shaft 43 will likewise be moved to the right and the gears 41 and 47 will be disengaged. The pin 49 will engage one of the slots 51 in the collar 52 with the result that the gear mechanism 56 will be caused to engage the rack 42 and the entire cradle 23 will be swung about the axis of the trunnions 21 and 22 and the tilt of the blade will likewise be altered. It will be borne in mind that the blade will tilt through the axis of the line 26.

The handle 57 may then be actuated so that the shaft 43 is locked against rotary movement and fore and aft movement with respect to the front cast tub portion 17.

It must be assumed that the slot 75 between the two table top portions 71 and 72 is the proper width. This being so the operator is ready to secure the workpiece to the sliding table top.

The workpiece may be secured to the sliding table top by means of a miter gauge construction of the type illustrated in copending application Serial No. 681,371, filed August 30, 1957 and now abandoned. A pistol-grip type of workpiece holder such as illustrated in Goldschmidt Patent No. 2,759,503, granted August 21, 1956, may likewise be used.

However let it be assumed that the blade 15 has been raised or lowered to a proper height and has been tilted to the proper angle with respect to the table top formed by the members 71 and 72. The operator then grips the handle 102 and swings the same to a predetermined position.

For example, when the handle 102 points directly downwardly the saw table may be moved fore and aft but the toggle switch handle 121 is urged to a position by the cam track 124 at which the circuit to the motor remains open.

When the handle 122 is swung in a counter clockwise direction 90° then and in that event the shaft 101 is likewise rotated and the offsets 114a and 114b engage the side walls of slot 113 jamming the washer 114 against shaft 101 thereby preventing fore and aft movement of the table with respect to the blade 15. The toggle switch handle 121 likewise remains unactuated with the result that the circuit to the motor remains open.

When the handle 102 is swung upwardly a further 90° in a counter clockwise direction the trigger 104 must be reciprocated. When the handle is in this position the circuit to the motor is closed and the table is free for fore and aft movement with respect to the tub assembly. This is the true sliding table saw operating position and the workpiece and the table may be urged fore and aft through the path of the blade.

Let it be assumed that the handle 102 is rotated a further 90° through its axis in a counter clockwise direction. When the handle is in this position the offsets 114a and 114b will engage slot 113 and the shaft 101 and the table assembly will be restricted against further fore and aft motion. However the circuit to the motor will remain closed since the toggle switch handle 121 will not be actuated by the cam track 124. When the device is in this position it is apparent that the assembly operates as a conventional table saw.

Figure 3:
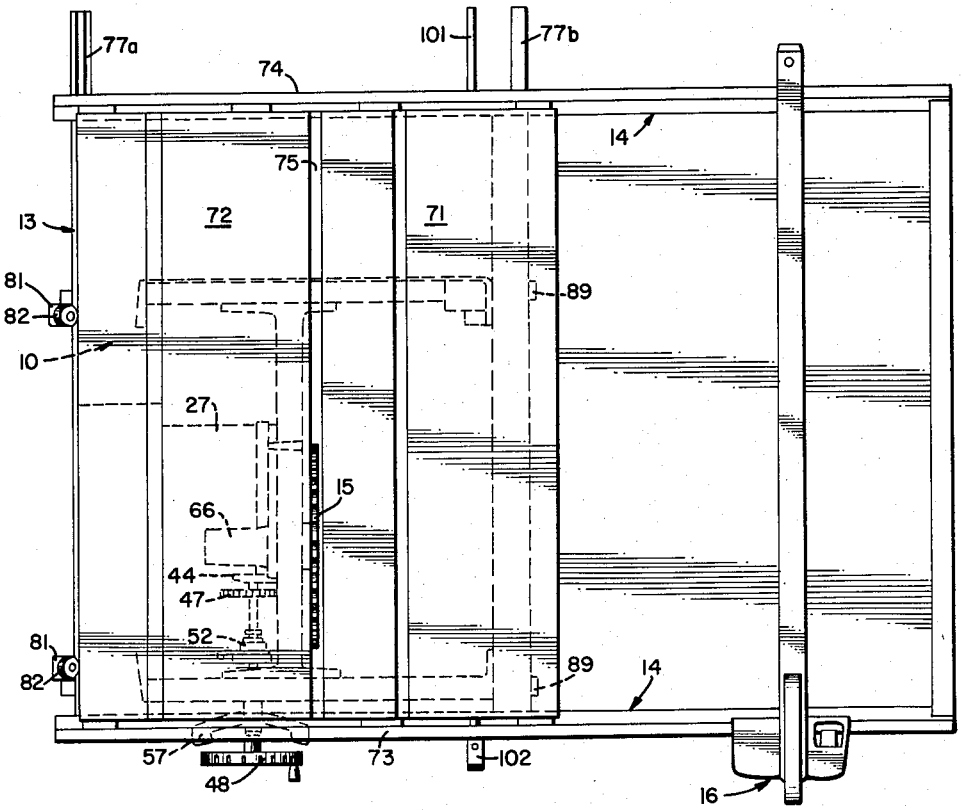
FIGURE 3 is a view similar in some respects to FIGURE 2; however, the table is in operating position and the motor and control mechanism are shown in dotted lines.
Figure 8:
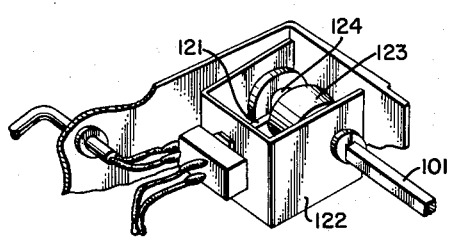
FIGURE 8 (Sheet 3) is a view of the switch mechanism which is associated with the single control mechanism illustrated in FIGURE 6 and which completes or interrupts the circuits to the motor.

We have illustrated a fence 16 which is movable laterally from the position shown in FIGURE 3 to a position over the table adjacent the saw blade 15. When the fence is so positioned a workpiece may be secured thereto and the entire fence and sliding table may be reciprocated horizontally. In this manner, a workpiece when secured to the fence 16, will be advanced with the table. This type of operation is particularly adaptable for use in connection with mortising and tenoning and similar operations.

We claim:

1. A sawing machine comprising a shaft for mounting a saw blade and the like and having power means for rotating said shaft, said shaft being tiltable for the making of angle cuts, said machine having a work supporting table, said table being in two parts disposed respectively, one on each side of said saw blade and the like, one of said parts being laterally adjustable with respect to the other and both with respect to said saw blade and the like, thus providing for a blade-accommodating slot of adjustable width, said table as a complete unit being slidable fore and aft through the path of said saw blade and the like, said blade being thus accommodated in said adjustable slot throughout the movement of said table.

2. The sawing machine according to claim 1 further including guides upon which said table as a complete unit is adapted to slide fore and aft through the path of said saw blade and the like, said guides being mounted on laterally extending support members, whereby the sliding axis of said table may be adjusted with respect to said saw blade and the like.

References Cited in the file of this patent

UNITED STATES PATENTS

| | | |
|---|---|---|
| 194,378 | Shaw | Aug. 21, 1877 |
| 429,836 | Beach | June 10, 1890 |
| 1,380,707 | Fehrm | June 7, 1921 |
| 1,593,317 | Thomas | July 20, 1926 |
| 2,323,248 | Sellmeyer | June 29, 1943 |
| 2,974,693 | Goldschmidt et al. | Mar. 14, 1961 |